US012151875B2

(12) United States Patent
Poppe et al.

(10) Patent No.: US 12,151,875 B2
(45) Date of Patent: Nov. 26, 2024

(54) BASKET

(71) Applicant: Altachem NV, Harelbeke (BE)

(72) Inventors: Jean-Marie Poppe, Heule (BE); Wouter Halfmaerten, Bruges (BE)

(73) Assignee: Altachem NV, Harelbeke (BE)

( * ) Notice: Subject to any disclaimer, the term of this patent is extended or adjusted under 35 U.S.C. 154(b) by 99 days.

(21) Appl. No.: 17/925,068

(22) PCT Filed: May 10, 2021

(86) PCT No.: PCT/EP2021/062376
§ 371 (c)(1),
(2) Date: Nov. 14, 2022

(87) PCT Pub. No.: WO2021/228790
PCT Pub. Date: Nov. 18, 2021

(65) Prior Publication Data
US 2023/0182992 A1 Jun. 15, 2023

(30) Foreign Application Priority Data
May 15, 2020 (BE) .................................. 2020/5345

(51) Int. Cl.
*B65D 83/20* (2006.01)
*B05B 9/08* (2006.01)

(52) U.S. Cl.
CPC .......... *B65D 83/207* (2013.01); *B05B 9/0805* (2013.01)

(58) Field of Classification Search
CPC ............................ B65D 83/207; B05B 9/0805
See application file for complete search history.

(56) References Cited

U.S. PATENT DOCUMENTS

| | | | | |
|---|---|---|---|---|
| 4,453,650 A * | 6/1984 | Witte | B65D 83/303 | 222/525 |
| 7,604,632 B2 * | 10/2009 | Howlett | A61B 18/0218 | 606/25 |
| 10,639,658 B1 * | 5/2020 | Enriquez | B05B 15/55 | |
| 2008/0011364 A1 * | 1/2008 | Fontaine | F16K 17/04 | 137/537 |
| 2011/0000937 A1 * | 1/2011 | Barker | B65D 83/48 | 222/402.1 |
| 2013/0062369 A1 * | 3/2013 | Engel | B65D 83/00 | 222/402.15 |

FOREIGN PATENT DOCUMENTS

| | | |
|---|---|---|
| EP | 1 611 959 A1 | 1/2006 |
| EP | 2 762 235 A1 | 8/2014 |
| WO | 2011/151295 A1 | 12/2011 |

OTHER PUBLICATIONS

International Search Report in PCT/EP2021/062376, dated Aug. 6, 2021.

* cited by examiner

*Primary Examiner* — Bob Zadeh
(74) *Attorney, Agent, or Firm* — Collard & Roe, P.C.

(57) ABSTRACT

A basket for securing a container to a dispenser has a device for connecting the basket with the dispenser and a device for connecting the basket with the container and a cylindrical seat for a valve of the container, wherein the basket provides a fluid connection between the container and the dispenser, wherein the basket provides a grip area for mounting the basket on the dispenser. The grip area is located on the cylindrical seat. The location of the grip area on the cylindrical seat reduces the height of the basket and improves the handling of the dispenser.

4 Claims, 3 Drawing Sheets

BASKET

CROSS REFERENCE TO RELATED APPLICATIONS

This application is the National Stage of PCT/EP2021/062376 filed on May 10, 2021, which claims priority under 35 U.S.C. § 119 of Belgium Application No. BE2020/5345 filed on May 15, 2020, the disclosure of which is incorporated by reference. The international application under PCT article 21(2) was not published in English.

BACKGROUND OF THE INVENTION

1. Field of the Invention

The invention concerns a basket for securing a container to a dispenser with means for connecting the basket with the dispenser and means for connecting the basket with the container and a cylindrical seat for a valve of the container, wherein the basket provides a fluid connection between the container and the dispenser, wherein the basket provides a grip area for mounting the basket on the dispenser.

2. Description of the Related Art

Dispensers are used for dispensing pressurized fluids which are stored in a container. They have a body structure that comprises a handle structure with a trigger and an outlet nozzle through which the fluid is dispensed. In order to secure the container to the dispenser, adapters are used. These adapters provide a fluid connection between the container and the dispenser. Such adapters are also called baskets. The basket provides a grip area for the single use function for connecting the basket to the dispenser. Usually, the dispenser and the basket are connected by a thread and the grip area is located directly above this thread. The basket is connected by a threaded joint with an interface ring of the container. These interface rings are used as a connecting means between the container and the dispenser. The basket has a cylindrical seat for establishing a sealed fluid connection between the valve of the container and the dispenser.

Baskets for dispensers for dispensing pressurized fluids are widely used in construction and repair work for the application of foam material, such as polyurethane foam. The dispenser can be used for applying the foam in mounting panels or other components. A problem encountered during the use of such dispensers is that the dispenser encounters obstructions, such as structural members, which impede or prevent access to locations at which foam is to be applied.

U.S. Pat. No. 10,639,658 B1 describes a portable, self-contained, hand-held spray gun system with an interchangeable cartridge containing a sprayable substance which may flow from the cartridge under pressure through a portion of the barrel past a selectively positionable needle valve and out of an exit orifice of a nozzle when the trigger is squeezed.

WO 2011/151295 A1 concerns a dual-purpose coupling piece for on the one hand side the screw coupling of a disposable pressure container with a dispensing gun, and which further comprises means for on the other hand also cooperating in a bayonet-type coupling which is suitable handheld applicator for application of the compound as in the handheld use.

EP 2 762 235 A1 concerns a device for dispensing pressurized fluids with a body structure that comprises a handle structure with a trigger, means for securing a container to said body structure and a fluid connection from the means for securing the container to an outlet nozzle of the device.

EP 1 611 959 A1 concerns a container suitable for holding paint or a similar fluid, to be sprayed with the aid of a spraying device, which container comprises a closed bottom and a circumferential wall, which at its underside is closed by the bottom and at its upper side comprises attachment means for detachably connecting to a lid onto which container a spraying gun can be mounted.

SUMMARY OF THE INVENTION

It is an object of the present invention to provide an optimized basket.

This object is achieved according to the invention by locating the grip area on the cylindrical seat for a valve of the container and is shaped for being seized by means of a screw wrench, wherein the grip area extends vertically inside the means for connecting the basket with the container.

The main advantages of these measures are the following. The location of the cylindrical seat of the basket reduces the overall height of the basket. The reduced height of the basket makes the assembly of the container and the dispenser more compact which makes the assembly more accessible for use in hard to reach areas where for example foam must be applied. Due to the reduced height of the basket, the dispenser can be used closer to the area where the fluid must be applied.

As a further advantage, the production costs of the basket are reduced. Due to the integration of the grip area on the cylindrical seat, there is no need for an additional grip area above the thread for connecting the basket to the dispenser. This reduces the amount of material needed for production and the production costs of the basket. Due to the reduced mass of the basket, less force is needed to handle the dispenser which reduces the strain on the wrist joint of the user.

According to an embodiment of the invention, the grip area has a hexagonal shape.

The hexagonal shape of the grip area simplifies the mounting of the basket on the dispenser. It allows fixing the basket by means of a screw wrench.

According to a preferred embodiment of the invention, the grip area extends vertically over the basket.

This feature makes it easier to seize the grip area with a screw wrench.

Alternatively, there can be openings in the wall of the basket which allow seizing the grip area, for example by means of a screw wrench.

BRIEF DESCRIPTION OF THE DRAWINGS

In the following, a preferred embodiment of the invention is described with reference to the figures wherein.

DETAILED DESCRIPTION OF THE PREFERRED EMBODIMENTS

The FIGS. 1 to 4 show the basket 1 in an unmounted state.

Figure 1:
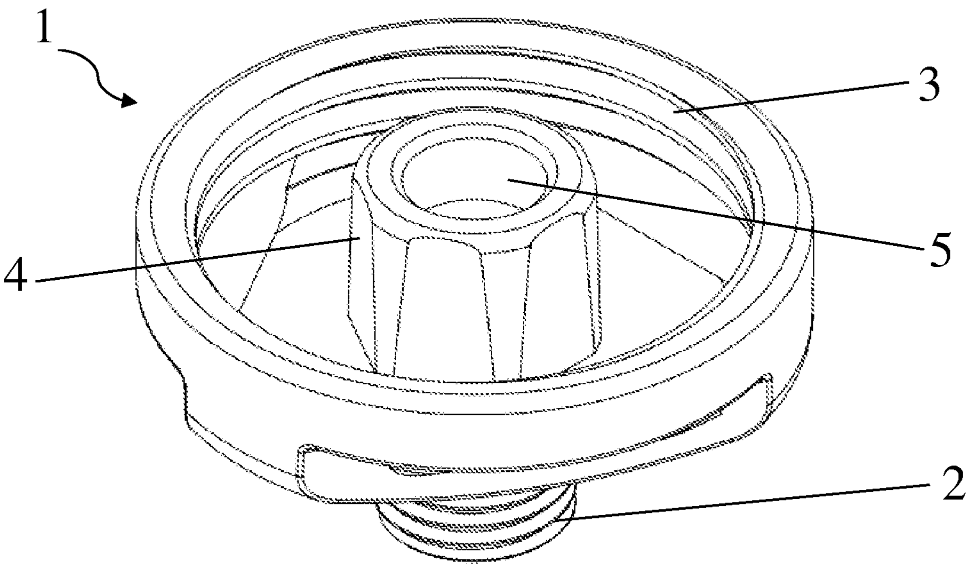
FIG. 1 shows a perspective view of a basket according to the present invention.
Figure 2:
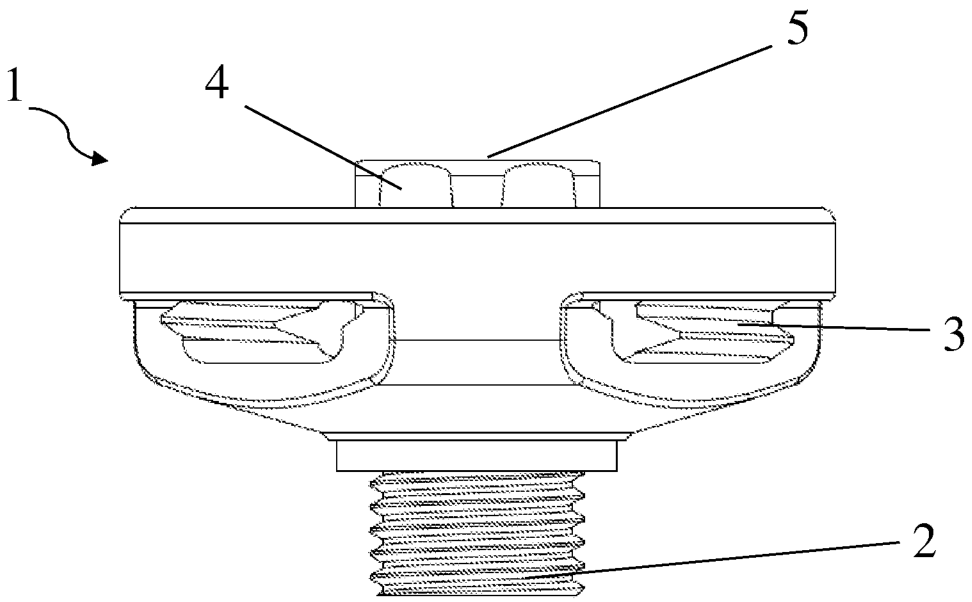
FIG. 2 shows a side view of the basket according to FIG. 1.
Figure 3:
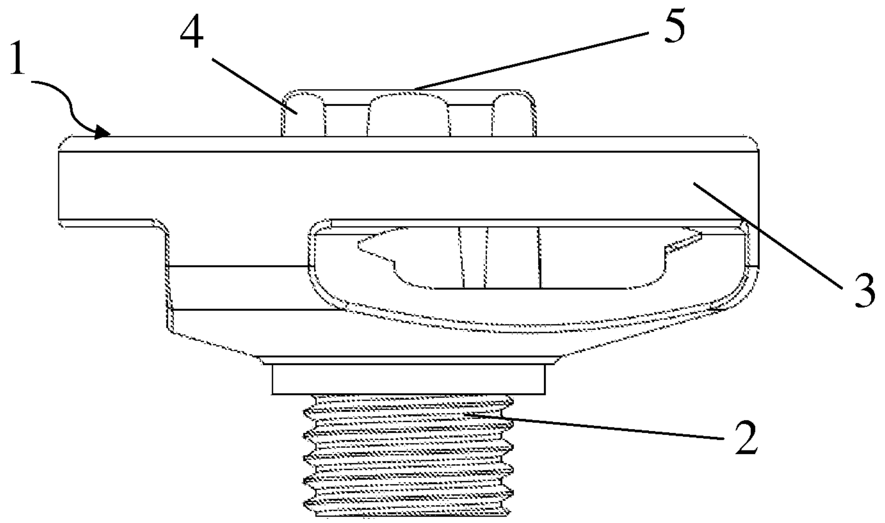
FIG. 3 shows another side view of the basket according to FIG. 1.
Figure 4:
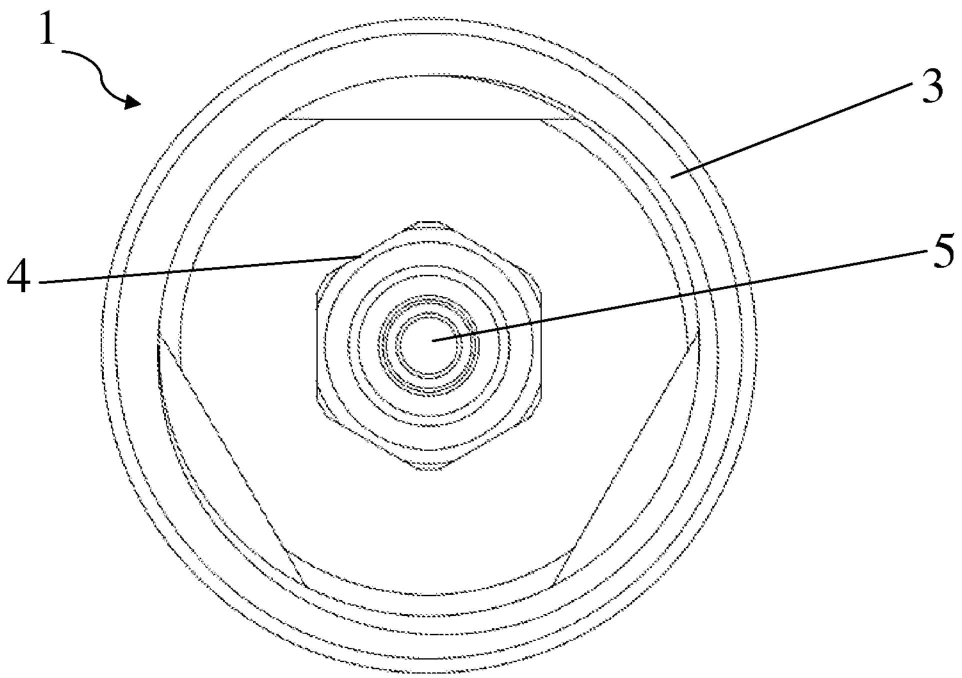
FIG. 4 shows a top view of the basket according to FIG. 1.
Figure 5:
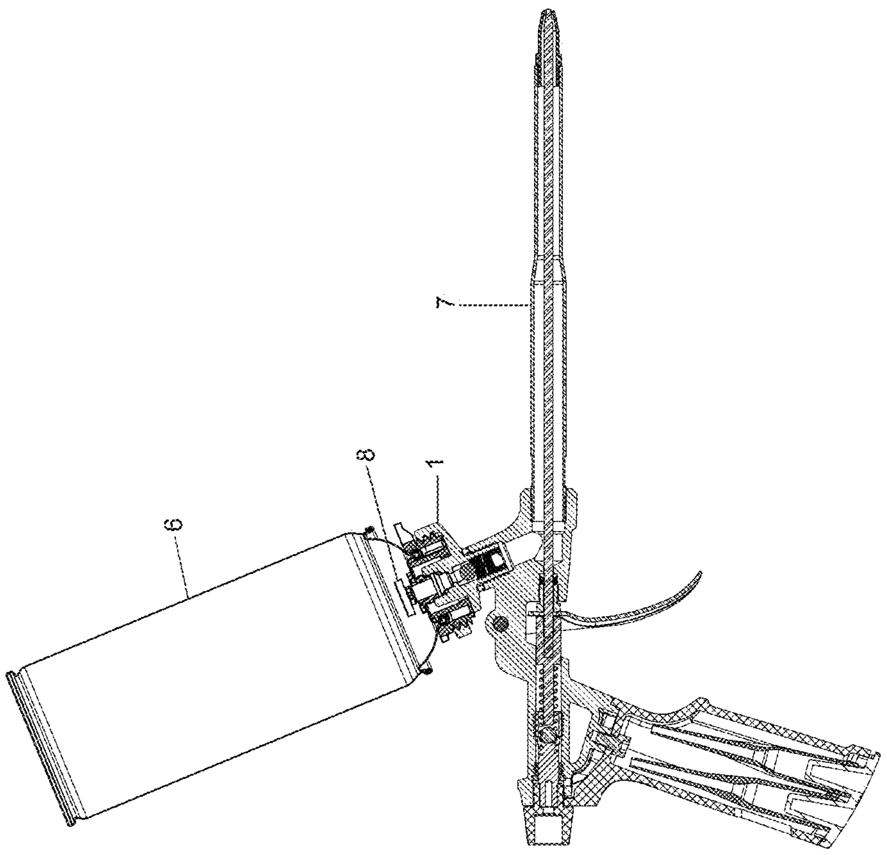
FIG. 5 shows a view partly in cross-section of the basket according to FIG. 1 in a mounted state with a container, including a valve, and a dispenser.

The basket 1 comprises of means 2 for connecting the basket with a dispenser 7 and means 3 for connecting the basket with a container 6. Both means 2, 3 are threaded joints. The basket 1 provides a fluid connection between the container 6 and the dispenser 7 in its mounted state shown in FIG. 5.

In order to connect the basket 1 to the dispenser 7, the basket provides a grip area 4. This grip area 4 has a hexagonal shape in order to simplify the mounting of the basket 1 on the dispenser 7. The grip area 4 is located on the cylindrical seat 5 of the basket. It can be seen from FIGS. 2 and 3 that the grip area 4 extends vertically over the basket 1 which makes it easier to seize it with the hand or a screw wrench.

The cylindrical seat 5 establishes a sealed fluid connection between a valve 8 of the container 6 and the dispenser 7. The integration of the grip area 4 on the cylindrical seat 5 reduces the height of the basket 1 and reduces the amount of material needed for production of the basket 1.

The invention claimed is:

1. A basket (1) for securing a container to a dispenser with means for connecting the basket with the dispenser (2) and means for connecting the basket with the container (3) and a cylindrical seat (5) for a valve of the container, wherein the basket (1) provides a fluid connection between the container and the dispenser, wherein the basket (1) provides a single grip area (4) for mounting the basket (1) on the dispenser, wherein the grip area (4) is located on the cylindrical seat (5) and is shaped for being seized by means of a screw wrench, wherein the grip area (4) extends vertically inside the means for connecting the basket with the container (3).

2. The basket (1) according to claim 1, wherein the grip area (4) has a hexagonal shape.

3. The basket (1) according to claim 1, wherein the grip area (4) extends vertically over the basket (1).

4. The basket (1) according to claim 1, wherein the basket (1) is provided with openings which allow seizing of the grip area (4).

* * * * *